United States Patent [19]

Kumar et al.

[11] Patent Number: 4,914,218

[45] Date of Patent: Apr. 3, 1990

[54] ADSORPTIVE PROCESS FOR SEPARATING MULTICOMPONENT GAS MIXTURES

[76] Inventors: Ravi Kumar, 991 N. Treeline Dr., Allentown, Pa. 18103; Wilbur C. Kratz, 7057 Heather Rd., Macungie, Pa. 18062; David L. Rarig, 830 Frank Dr., Emmaus, Pa. 18049; David E. Guro, 1141 Snyder Rd., Lansdale, Pa. 19446; William P. Schmidt, Apartment - Linden 2C, Allentown, Pa. 18104

[21] Appl. No.: 313,580

[22] Filed: Feb. 17, 1989

[51] Int. Cl.$^4$ .............................................. B01D 53/04
[52] U.S. Cl. ........................................ 55/26; 55/58; 55/62; 55/68; 55/73; 55/74; 55/75
[58] Field of Search ................... 55/25, 26, 58, 62, 68, 55/73, 74, 75

[56] References Cited

U.S. PATENT DOCUMENTS

| Re. 31,014 | 8/1982 | Sircar | 55/26 |
|---|---|---|---|
| 3,252,268 | 5/1966 | Stark | 55/25 |
| 4,171,207 | 10/1979 | Sircar | 55/26 |
| 4,529,412 | 7/1985 | Hayashi et al. | 55/58 X |
| 4,539,020 | 9/1985 | Sakuraya et al. | 55/26 |
| 4,737,167 | 4/1988 | Ohtani et al. | 55/26 |
| 4,770,676 | 9/1988 | Sircar et al. | 55/26 |
| 4,790,858 | 12/1988 | Sircar | 55/26 |
| 4,813,980 | 3/1989 | Sircar | 55/26 |

FOREIGN PATENT DOCUMENTS

| 0129444 | 12/1984 | European Pat. Off. | 55/26 |
|---|---|---|---|
| 3543468 | 6/1987 | Fed. Rep. of Germany | 55/25 |
| 60-103002 | 6/1985 | Japan. | |
| 62-250927 | 10/1987 | Japan | 55/25 |

Primary Examiner—Robert Spitzer
Attorney, Agent, or Firm—John M. Fernbacher; James C. Simmons; William F. Marsh

[57] ABSTRACT

An improved pressure swing adsorption process is disclosed for the recovery of two individual components from a multicomponent gas mixture. The process utilizes a first group of adsorbent beds selective for the secondary component product and a second group of beds selective for tertiary impurities in the mixture. The gas mixture is passed through the first and second beds in series and high purity primary component product is discharged from the second beds. The secondary component product is recovered by desorption from the first beds. Product recovery is improved by recycling depressurization gas from the first beds and by several novel pressure equalization steps. The process can be used to recover high-purity hydrogen and carbon dioxide from a gas mixture containing these components along with minor amounts of methane, carbon monoxide, and nitrogen.

29 Claims, 3 Drawing Sheets

ADSORPTIVE PROCESS FOR SEPARATING MULTICOMPONENT GAS MIXTURES

TECHNICAL FIELD

The present invention relates in general to the separation of gas mixtures, with individual recovery of at least two of the components contained therein, by pressure swing adsorption.

BACKGROUND OF THE INVENTION

The separation of multicomponent gas mixtures by pressure swing adsorption (PSA) is a well-established and widely-practiced technology. A large body of prior art in this field pertains to the recovery of a single component at high purity from a mixture of that component with impurities present at lower concentrations, or the recovery of one product at high purity and a second product at low purity from a gas mixture. One example of the former is the recovery of high-purity hydrogen from petroleum refinery gas streams; an example of the latter is the separation of air into a medium- to high-purity nitrogen stream and a low-purity, oxygen-rich stream. In these types of separations, parallel adsorbent beds are operated sequentially as parallel sets of single-stage adsorbers.

There is a smaller body of prior art in which at least two products, in some cases both at high purity, are recovered from a gas mixture in a series of staged or semi-staged adsorbent beds, each stage of which is selective for a different component or group of components in the mixture. U.S. Pat. No. 3,252,268 discloses a PSA system comprising three adsorption stages in which a product is recovered in part at moderately high purity and in part at ultra-high purity. In this system, the first stage adsorbs most of the major contaminants in the feed stream, the second stage selectively adsorbs at least one impurity component in the effluent from the first stage, and the third stage selectively adsorbs at least one impurity component in the effluent from the second stage. An ultra-high purity product is recovered as the effluent from the third stage adsorber, and a moderately pure product is recovered as effluent from the second stage adsorber and as depressurization gas from the third stage adsorber. As an example, ultra-pure hydrogen at 99.995% purity and moderately-pure hydrogen at 99% purity are recovered from refinery off gases by the disclosed process.

U.S. Pat. No. 4,171,207 discloses a PSA system comprising two groups of adsorbent beds for the recovery of two high-purity products from a gas mixture containing a primary key component, a secondary key component which is more strongly adsorbed than the primary key component, and one or more tertiary components at low concentrations which are more strongly adsorbed than the primary or secondary key components. The gas mixture is passed through a first adsorbent bed in which the tertiary components are selectively adsorbed, and then through a second adsorbent bed in which the secondary key component is selectively adsorbed; a product stream of high-purity primary key component is withdrawn as an effluent stream from the second adsorbent bed. Flow through the two beds is then discontinued, and the second bed is rinsed at feed pressure with a stream of high-purity secondary key component. This rinse step displaces other components present in the bed and saturates the bed with secondary key component. High-purity secondary key component then is recovered by desorption from the second adsorbent bed. An example of this process is the adsorptive separation of a mixture of hydrogen, methane, and $C_2^+$ hydrocarbons to recover high-purity hydrogen as the primary key component and high-purity methane as the secondary key component.

U.S. Patent No. Re. 31,014, a reissue of U.S. Pat. No. 4,171,206, discloses a PSA system comprising two sets of adsorbent beds for the recovery of two high-purity products from a gas mixture containing a primary key component, a secondary key component which is more strongly adsorbed than the primary key component, and one or more tertiary components at low concentration which are less strongly adsorbed than the secondary key component and more strongly adsorbed than the primary key component. The gas mixture is passed through a first adsorbent bed in which the secondary key component is selectively adsorbed, and then through a second adsorbent bed in which the tertiary components are selectively adsorbed; a product stream of high-purity primary key component is withdrawn as an effluent stream from the second adsorbent bed. Flow through the two beds is then discontinued, and the first bed is rinsed at feed pressure with a stream of high-purity secondary key component. This rinse step displaces other components present in the bed and saturates the bed with secondary key component. High-purity secondary key component is then recovered by desorption from the first adsorbent bed. An example of this process is the adsorptive separation of a mixture of hydrogen, carbon dioxide, carbon monoxide, methane, and nitrogen to recover high-purity hydrogen as the primary key component and high-purity carbon dioxide as the secondary key component.

Japanese Patent Application No. 58-205,592 discloses a three-stage PSA process for the recovery of three individual products from a multicomponent gas mixture comprising hydrogen, carbon monoxide, carbon dioxide, and nitrogen. Such a gas mixture is recovered, for example, from a steel converter furnace. The process comprises three separate multi-bed PSA systems arranged in series; the feed gas is passed through the first stage PSA in which $CO_2$ is preferentially adsorbed, through the second stage PSA in which CO is preferentially adsorbed, and then through the third stage PSA in which $N_2$ and residual CO are preferentially adsorbed. Hydrogen product is recovered as third stage effluent. $CO_2$ is recovered by desorption from the first stage and CO is recovered, after a rinse step, by desorption from the second stage. An example is disclosed in which CO is recovered at 99.4% purity and $H_2$ at 99.9% purity. $CO_2$ purity is not disclosed, but based upon the process steps used in the first PSA, would be at low purity compared with recovered CO and $H_2$. The three PSA systems operate independently, except for the use of the third stage waste stream comprising $N_2$ and CO as purge gas in the first stage. No intersystem pressure equalization steps are used in the process.

U.S. Pat. No. 4,539,020 discloses a two-stage PSA process for recovering carbon monoxide from a feed gas comprising carbon monoxide, carbon dioxide, and components less adsorbable than carbon monoxide. Feed gas is passed to a first PSA system in which $CO_2$ is selectively adsorbed and recovered by the steps of adsorption, depressurization, evacuation, purging with waste gas from the second stage PSA system, and repressurization with first stage product gas. Effluent from the first stage PSA is introduced into the second stage PSA in which carbon monoxide is selectively adsorbed and recovered by the steps of adsorption, partial depressurization, pressure equalization, purge with product CO, evacuation yielding product CO, pressure equalization, and final repressurization to the adsorption pressure with purge effluent from another adsorbent bed in the second stage PSA system. A $CO_2$-rich waste gas is produced by the first stage PSA; the CO product from the second stage PSA contains less than 0.5% $CO_2$ and less than 1% $N_2$.

U.S. Pat. No. 4,790,858 discloses an improvement to previously cited U.S. Patent Re. 31,014 wherein additional primary key component is recovered by passing the waste stream from the second set of adsorbent beds to a third set of adsorbent beds in which additional secondary key tertiary components are selectively adsorbed. The additional recovered primary key component from the third adsorbent bed is used in part for purging the second adsorbent bed, and for purging and repressurizing another third adsorbent bed.

A distinguishing feature of the earlier cited U.S. Pat. No. 4,171,207 and U.S. Patent No. Re. 31,014 is the high-pressure rinse step in which high-purity secondary key component is utilized to rinse at the adsorption pressure the adsorbent bed in which the secondary key component has been selectively adsorbed. This step is important in the recovery of secondary key component at high purity.

SUMMARY OF THE INVENTION

The present invention is an improved pressure swing adsorption process for the separation of a multicomponent gas mixture to recover as individual products a primary key component and a secondary key component, wherein the secondary key component is more strongly adsorbed than the primary key component and there is present in the multicomponent gas mixture one or more minor tertiary components at low concentrations which are less strongly adsorbed than the secondary key component, by passing the multicomponent gas mixture in an adsorption step through a first bed of adsorbent selective for retention of the secondary key component, passing the effluent from the first bed through a second bed of adsorbent selective for the retention of the secondary key component and of the one or more minor tertiary components, withdrawing from the second bed a high-purity product stream of the primary key component, and continuing the passing of the multicomponent gas mixture through the first and second beds until the concentration of the secondary key component in the effluent from the first bed or the concentration of at least one of the tertiary components in the high-purity stream of said primary key component from the second bed reach predetermined levels, or until a predetermined time period has elapsed; the improvement comprising discontinuing flow of the multicomponent gas mixture through the first and second beds at the end of the adsorption step and thereafter during a mutually extending time period (1) depressurizing the first bed, immediately after the discontinuing of flow through the first and second beds, by withdrawing from the first bed a first gas stream comprising desorbed and void space gas until the concentration of the secondary key component reaches a predetermined level in the gas stream or until a predetermined pressure is reached, (2) evacuating the first bed by withdrawing a product stream of substantially pure secondary key component, (3) depressurizing the second bed by withdrawing a gas stream comprising desorbed and void space gas, and (4) purging the second bed with a stream of the primary key component whereby additional adsorbed components are desorbed and are withdrawn along with remaining void space gas in a purge effluent stream; and thereafter following the mutually extending time period, (5) further pressurizing the first and second beds to a pressure up to the pressure of the adsorption step by passing a portion of the high-purity product stream of primary key component into and through the second bed and passing pressurization effluent from the second bed into the first bed, whereby both beds are prepared for another cycle beginning with the adsorption step.

The first bed of adsorbent is one of a first group of multiple parallel beds and the second bed of adsorbent is one of a second group of multiple parallel beds; each bed of the first group is paired with a corresponding bed of the second group, and each pair of beds undergoes in turn the adsorption step, steps (1) through (4) during the mutually extending time period, and the pressurization step (5).

In the first and preferred embodiment of the invention, the basic process steps as summarized above are utilized, and in addition, several intermediate pressurization and depressurization steps are included to increase product recovery. In these intermediate steps, pressurization and depressurization are accomplished by pressure equalization between pairs of beds; the resulting interbed flow of gas allows product components normally lost in the above recited depressurization and purge steps to be retained in the adsorbent beds thus increasing product recovery. In the preferred embodiment, pressurization and depressurization steps by means of pressure equalization, and an additional depressurization step, are carried out as follows:

(1a) depressurization of the second bed, upon completion of the adsorption step, by connecting it with an alternate second bed which has completed its pressurization step (4a) so that gas flows from the second bed into the alternate second bed and the pressures in both beds are equalized at a first intermediate pressure, (1b) further depressurization of the second bed, following depressurization step (1a), by connecting it with an alternate first bed which has completed its evacuation step (2) so that gas flows from the second bed into the alternate first bed and the pressures in both beds are equalized at a second intermediate pressure.

(1c) further depressurization of the second bed, following depressurization step (1b), by connecting it with another alternate second bed which has completed its purge step (4) so that gas flows from the second bed into the other alternate second bed and the pressures in both beds are equalized at a third intermediate pressure, (1d) further depressurization in a final blowdown step of the first bed, after completion of depressurization step (1) of the first bed, by withdrawing a second gas stream containing desorbed and void space gas which is rich in the secondary key component, and which may be used as additional secondary component product, (4a) pressurization of the second bed, following completion of purge step (4) of the second bed, by connecting it with still another alternate second bed which has completed its depressurization step (1b) so that gas flows from the latter bed into the second bed and the pressures in both beds are equalized at the third intermediate pressure, (4b) further pressurization of the second bed, following pressurization step (4a), by connecting it with the alternate second bed which has completed its adsorption step so that gas flows from the latter bed into the second bed so that the pressures in both beds are equalized at the first intermediate pressure, (2a) pressurization of the first bed, following completion of evacuation step (2) of the first bed and pressurization step (4b) of the second bed, by connecting it with the alternate second bed which has completed its depressurization step (1a) so that gas flows from the latter bed into the first bed and the pressures in both beds are equalized at the second intermediate pressure, and (4c) pressurization of the second bed, following pressurization step (4b) of the second bed, by flowing a portion of the high-purity primary key component product thereinto.

In a second embodiment of the invention, the adsorption step is carried out in the same manner as described above in the first embodiment. The following steps described above for the first embodiment also are utilized in the second embodiment: (1) depressurization of the first bed; (1d) further depressurization of the first bed; (2) evacuation of the first bed; (3) depressurization of the second bed; (4) purge of the second bed; and (5) final pressurization of the first and second beds. The additional pressurization and depressurization steps are carried out in the second embodiment:

(1a) depressurization of the second bed, following the adsorption step, by connecting the second bed with an alternate first bed which has completed its evacuation step (2) so that gas flows from the second bed into the alternate first bed and the pressures in both beds are equalized at a first intermediate pressure, (1b) further depressurization of the second bed, following depressurization step (1a), by connecting it with an alternate second bed which has completed its purge step (4) so that gas flows from the second bed into the alternate second bed and the pressures in both beds are equalized at a second intermediate pressure, (4a) pressurization of the second bed, following purge step (4) of the second bed, by connecting it with another alternate second bed which has completed its depressurization step (1a) so that gas flows from the latter bed into the second bed and the pressures in both beds are equalized at the second intermediate pressure, (4b) further pressurization of the second bed, following pressurization step (4a) of the second bed, by flowing a portion of the high-purity primary key component product into the second bed, and (2a) pressurization of the first bed, following evacuation step (2) of the first bed, by connecting it with still another alternate second bed which has completed its adsorption step, so that gas flows from the latter bed into the first bed and the pressures in both beds are equalized at the first intermediate pressure.

In a third embodiment of the present invention, the adsorption step is carried out in the same manner as described above in the first and second embodiments. The following steps described in the first two embodiments are also utilized in the third embodiment: (1) depressurization of the first bed; (2) evacuation of the first bed; (3) depressurization of the second bed; (4) purge of the second bed; and (5) final pressurization of the first and second beds. Optionally, further depressurization step (1d) as described in the first two embodiments can be carried out after depressurization step (1).

The additional pressurization and depressurization steps are carried out in the third embodiment:

(1a) depressurization of the second bed, after the adsorption step, by connecting the second bed to an alternate first bed which has completed its evacuation step (2) so that gas flows from the second bed into the alternate first bed and the pressures in both beds are equalized at a first intermediate pressure, (1b) further depressurization of the second bed, following depressurization step (1a), by connecting the second bed with an alternate second bed which has completed its purge step (4) so that gas flows from the second bed into the alternate second bed and the pressures in both beds are equalized at a second intermediate pressure, (2a) pressurization of the first bed, after the evacuation step (2) of the first bed, by connecting it with the alternate second bed which has just completed its adsorption step so that gas flows from the alternate second bed into the first bed and the pressures in both beds are equalized at the first intermediate pressure, and (4a) pressurization of the second bed, after completion of purge step (4) of the second bed, by connecting it to the alternate second bed which has completed its depressurization step (1a) so that gas flows from the alternate second bed into the second bed so that the pressures in both beds are equalized at the second intermediate pressure.

In a fourth embodiment of the present invention, the adsorption step is carried out in the same manner as described above in the first three embodiments. The following steps described in the first three embodiments are also utilized in the fourth embodiment: (1) depressurization of the first bed; (2) evacuation of the first bed; (3) depressurization of the second bed; (4) purge of the second bed; and (5) final pressurization of the first and second beds. Optionally, further depressurization step (1d) as described in the previous embodiments can be carried out after depressurization step (1). The additional pressurization and depressurization steps are carried out in the fourth embodiment:

(1a) depressurization of the second bed, after the adsorption step, by connecting it with an alternate second bed which has completed its purge step (4) so that gas flows from the second bed into the alternate second bed and the pressure in both beds are equalized at a first intermediate pressure, (1b) further depressurization of the second bed, following depressurization step (1a) of the second bed, by connecting it with an alternate first bed which is initially at a third intermediate pressure so that gas flows from the second bed into the alternate first bed and the pressure in both beds are equalized at a second intermediate pressure, (1c) further depressurization of the second bed, following depressurization step (1b) of the second bed, by connecting it with another alternate first bed which has completed its evacuation step (2) so that gas flows from the second bed into the the alternate first bed and the pressures in both beds are equalized at the third intermediate pressure, (2a) pressurization of the first bed, after completion of evacuation step (2) of the first bed, by connecting it with another alternate second bed which has completed its depressurization step (1b) so that gas flows from the latter bed into the first bed so that pressure in both beds are equalized at the third intermediate pressure, (4a) pressurization of the second bed, which has completed its purge step (4), by connecting it with the alternate second bed which has completed its adsorption step so that gas flows from the latter bed into the second bed and the pressures in both beds are equalized at the first intermediate pressure, and (2b) further pressurization of the first bed, which has completed its pressurization step (2a), by connecting it with the alternate second bed which has completed its depressurization step (1a) so that gas flows from the latter bed into the first bed and the pressures in both beds are equalized at the second intermediate pressure.

The preceding discussion summarizes the process cycle steps for a given pair of first and second beds. Additional pairs of first and second beds undergo, in turn, the same steps. For the embodiments discussed above, four pairs of first and second beds can be utilized for efficient process operation.

By utilizing the above preferred embodiment of the present invention, a gas mixture containing hydrogen as the primary key component, carbon dioxide as the secondary key component, and carbon monoxide, methane, and nitrogen as tertiary components, can be separated into a very high-purity hydrogen product (>99.99 mole % $H_2$) and a high-purity carbon dioxide product (>97 mole % $CO_2$).

Further recovery of product components is accomplished by recycling at least a portion of the gas from depressurization step (1) of the first bed and combining it with the fresh feed to the first bed. Further recovery of primary key component is optionally accomplished by passing at least a portion of the gas from depressurization step (3) and purge step (4) of the second bed through a third bed of adsorbent, which is one of a group of multiple parallel beds of adsorbent, in which remaining impurities are substantially removed and from which additional primary key component product is withdrawn. At least a portion of this product is used to purge the second beds.

DETAILED DESCRIPTION OF THE INVENTION

Figure 1:
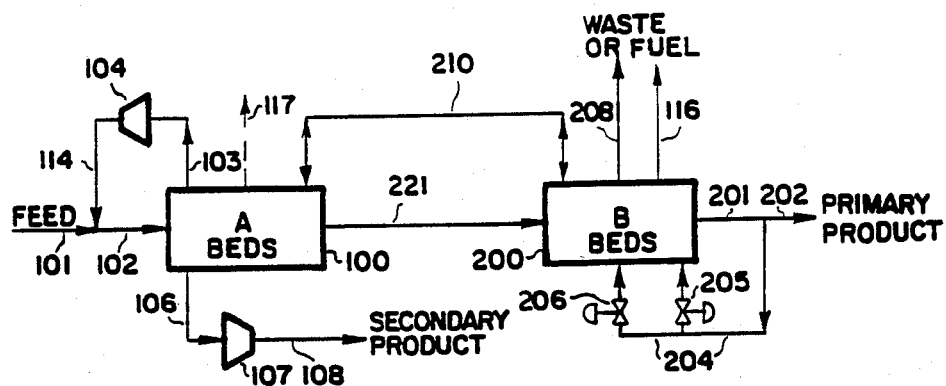
FIG. 1 is a schematic diagram of the present invention showing the general flow of gas for the first (A) beds and the second (B) beds.

The general gas flows for four embodiments of the present invention are shown schematically in FIG. 1. The groups of first (A) beds and second (B) beds each comprise four parallel beds of adsorbent. Pressurized feed gas mixture enters the system as stream 101 and is combined with recycle stream 114 and the combined stream 102 passes to the first or A beds 100. In the A beds, as described in detail below, the secondary key component is selectively adsorbed. Desorbed secondary key component is evacuated from the A beds as stream 106 by vacuum blower 107, and is provided in slightly pressurized stream 108 as secondary key component product. Depressurization gas from step (1) of the A beds is withdrawn as stream 103, compressed in compressor 104, and recycled to feed as stream 114. Additional depressurization or blowdown gas from step (1d) of the A beds is optionally withdrawn as stream 117 and is optionally used as additional secondary product.

The A bed representative effluent stream 221 passes into the second or B beds 200 in which the tertiary components are adsorbed, and high purity primary key component is withdrawn as stream 201. Secondary and tertiary components are desorbed from the B beds and are discharged as depressurization and purge effluent streams 208 and 116, respectively. A portion of stream 201 is taken through manifold 204 and passes to the B beds for pressurization through control valve 205 and for purging through pressure reducing valve 206. Primary key component product is withdrawn as stream 202. Pressure equalization and pressurization gas flows between the A and B beds are shown as stream 210.

Figure 2:
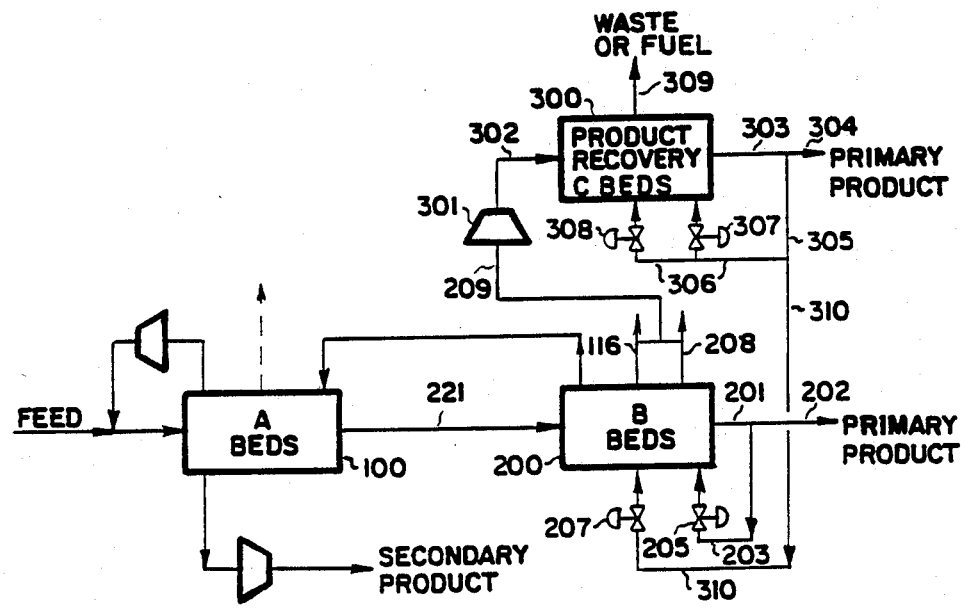
FIG. 2 is a schematic diagram of the present invention showing additional (C) beds for increased primary key component product recovery.

In an alternate embodiment, additional primary key component is recovered as shown in FIG. 2. At least a portion of each waste gas stream 208 and 116 from the depressurization and purge steps of the B beds are combined in stream 209 and compressed in compressor 301, and are passed to a gas storage tank (not shown). Gas from the tank as stream 302 passes into product recovery (C) beds 300 in which remaining secondary and tertiary components are selectively adsorbed as described in more detail below. Desorbed secondary and tertiary components in stream 309 are sent to waste or used as fuel. Additional recovered primary key component, stream 303, is used totally or in part as stream 305 for purging and repressurization. A portion of stream 305 is taken through manifold 306 and passes to product recovery or C beds 300 as purge through pressure reduction valve 307 and another portion as repressurization gas through flow control valve 308. Additional primary key component is passed as stream 310 through pressure reduction valve 207 for purging of B beds 200. Any remaining primary key component is taken as additional product as stream 304.

Figure 3:
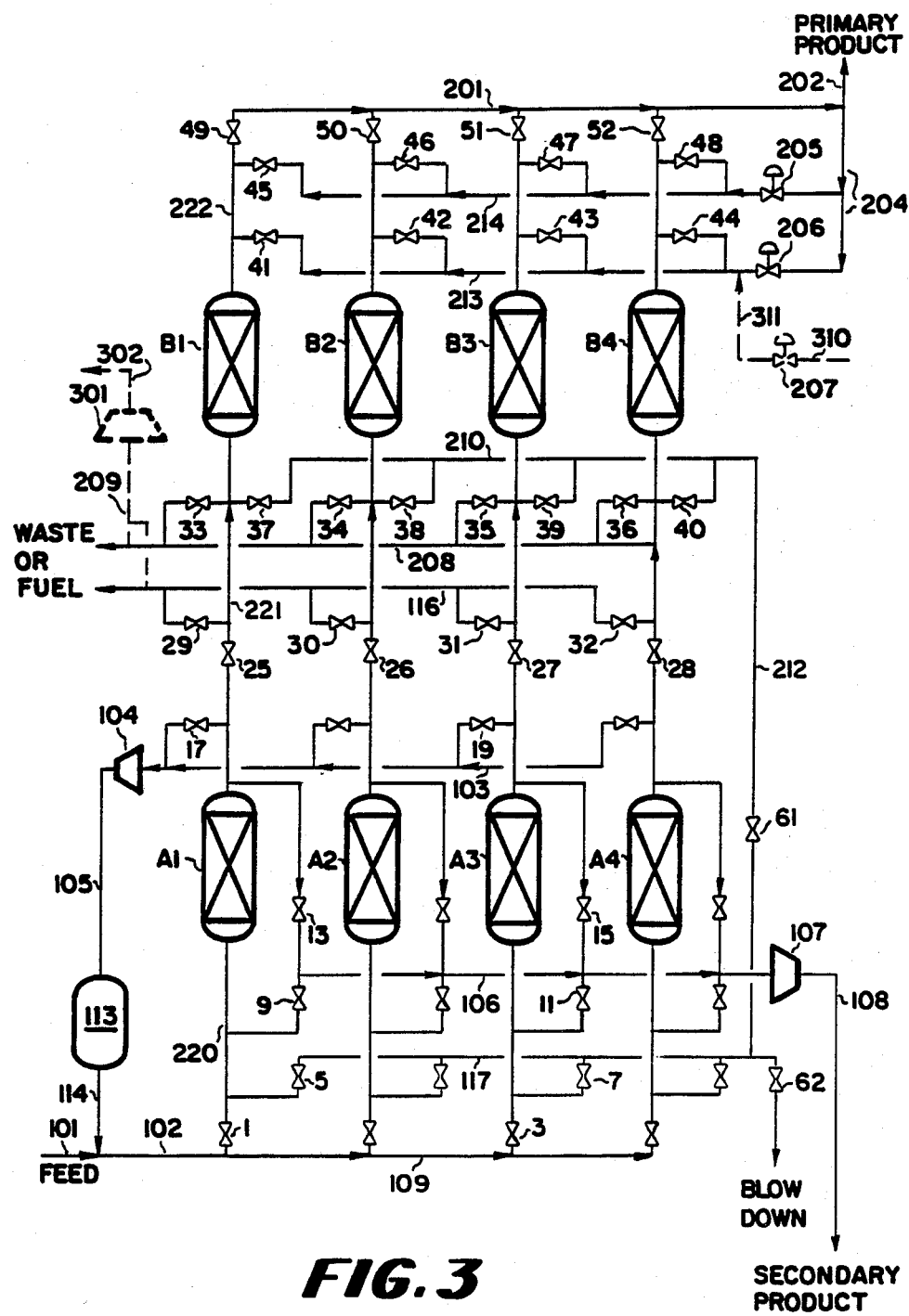
FIG. 3 is a process flow diagram for the first and second embodiments of the present invention.

A detailed description of the first and second embodiments of the present invention, utilizing four A beds and four B beds as shown in FIG. 3, will now be given. The piping and valving in FIG. 3 are arranged such that any given pair of A and B beds (for example, A1 and B1) are in series flow communication during the adsorption step and repressurization step (5) as previously described. In addition, any pair of A beds, any pair of B beds, or any pair of A and B beds can be isolated and interconnected for pressure equalization as previously discussed.

In each of the two embodiments utilizing the process configuration of FIG. 3, each pair of A and B beds (A1 and B1, A2 and B2, A3 and B3, A4 and B4) are subjected in turn to the process cycle steps summarized earlier and given in Tables 1 and 2. The following detailed process cycle steps will be given only for the first pair of beds, A1 and B1.

The process cycle steps for the first embodiment of the present invention are given in Table 1. Referring now to Table 1 and FIG. 3, the detailed process steps for this embodiment (using step designations previously defined) are as follows. The adsorption step for beds A1 and B1 begins with valves 1, 25, and 49 open, and valves 5, 9, 13, 17, 29, 33, 37, 41, 45, 50, 51, and 52 closed; both beds are at or somewhat below the adsorption pressure of between 30 and 500 psia, having been pressurized during the previous step.

TABLE 1

Process Cycle Steps
(Embodiment #1)

| Time Period | Bed → A1 | A2 | A3 | A4 | B1 | B2 | B3 | B4 |
|---|---|---|---|---|---|---|---|---|
| 1  | A   | EV  | BD  | DP  | A   | PE3 | PU  | PE3 |
| 2  | A   | PE1 | EV  | DP  | A   | PR  | PU  | PE1 |
| 3  | A   | PE1 | EV  | DP  | A   | PR  | PU  | PE1 |
| 4  | A   | RP  | EV  | DP  | A   | RP  | PE2 | PE2 |
| 5  | A   | RP  | EV  | DP  | A   | RP  | I   | DP  |
| 6  | A   | RP  | EV  | DP  | A   | RP  | I   | DP  |
| 7  | A   | RP  | EV  | DP  | A   | RP  | I   | DP  |
| 8  | A   | RP  | EV  | BD  | A   | RP  | I   | PU  |
| 9  | DP  | A   | EV  | BD  | PE3 | A   | PE3 | PU  |
| 10 | DP  | A   | PE1 | EV  | PE1 | A   | PR  | PU  |
| 11 | DP  | A   | PE1 | EV  | PE1 | A   | PR  | PU  |
| 12 | DP  | A   | RP  | EV  | PE2 | A   | RP  | PE2 |
| 13 | DP  | A   | RP  | EV  | DP  | A   | RP  | I   |
| 14 | DP  | A   | RP  | EV  | DP  | A   | RP  | I   |
| 15 | DP  | A   | RP  | EV  | DP  | A   | RP  | I   |
| 16 | BD  | A   | RP  | EV  | PU  | A   | RP  | I   |
| 17 | BD  | DP  | A   | EV  | PU  | PE3 | A   | PE3 |
| 18 | EV  | DP  | A   | PE1 | PU  | PE1 | A   | PR  |
| 19 | EV  | DP  | A   | PE1 | PU  | PE1 | A   | PR  |
| 20 | EV  | DP  | A   | RP  | PE2 | PE2 | A   | RP  |
| 21 | EV  | DP  | A   | RP  | I   | DP  | A   | RP  |
| 22 | EV  | DP  | A   | RP  | I   | DP  | A   | RP  |
| 23 | EV  | DP  | A   | RP  | I   | DP  | A   | RP  |
| 24 | EV  | BD  | A   | RP  | I   | PU  | A   | RP  |
| 25 | EV  | BD  | DP  | A   | PE3 | PU  | PE3 | A   |
| 26 | PE1 | EV  | DP  | A   | PR  | PU  | PE1 | A   |
| 27 | PE1 | EV  | DP  | A   | PR  | PU  | PE1 | A   |
| 28 | RP  | EV  | DP  | A   | RP  | PE2 | PE2 | A   |
| 29 | RP  | EV  | DP  | A   | RP  | I   | DP  | A   |
| 30 | RP  | EV  | DP  | A   | RP  | I   | DP  | A   |
| 31 | RP  | EV  | DP  | A   | RP  | I   | DP  | A   |
| 32 | RP  | EV  | BD  | A   | RP  | I   | PU  | A   |

A = Adsorption
DP = Depressurization (Steps 1, 3)
EV = Evacuation (Step 2)
PE1 = First Pressure Equalization (Steps 1b, 2a)
PE2 = Second Pressure Equalization (Steps 1c, 4a)
PE3 = Third Pressure Equalization (Steps 1a, 4b)
PU = Purge (Step 4)
RP = Repressurization or Final Pressurization (Step 5)
I = Idle
BD = Blowdown or Further Depressurization (Step 1d)
PR = Initial Pressurization (Step 4c)

Multicomponent gas mixture feed at the adsorption pressure and typically between 40° and 200° F. flows through line 101, is combined with recycle stream 114, and the combined stream flows through line 102 manifold 109, valve 1, line 220, bed A1, valve 25, line 221, bed B1, line 222, valve 49, manifold 201, and primary key component product is taken through line 202. When the concentration of secondary key component in bed A1 effluent (line 221), or the concentration of at least one teritary component in bed B1 effluent (line 222) reaches a predetermined level, or after a predetermined time period, the adsorption step is completed and beds A1 and B1 are isolated by closing valves 1, 25, and 49. Next, bed A1 is depressurized by opening valve 17 whereby desorbed and void space gas flow from bed A1 and through manifold 103, the gas is compressed by compressor 104, flows through line 105 into gas storage vessel 113, from where it is recycled through line 114 to join feed stream 101. This step continues for a predetermined amount of time, or until bed A1 reaches a predetermined pressure, or until the concentration of secondary key component in the bed A1 depressurization gas reaches a predetermined level. While bed A1 is depressurizing, bed B1 is depressurized to a first intermediate pressure (step (1a)) by opening valve 37 (valves 27, 31, 35, 43, 47, and 51 were closed during previous steps) so that depressurization gas flows from bed B1 through manifold 210 into bed B3 (bed B3 earlier completed its pressurization step (4a)). While bed A1 depressurization continues, valve 39 is closed to complete bed B1 depressurization step (1a), and valves 7 and 61 are opened (valves 3, 11, 15, 19, and 27 were closed in previous steps) so that gas now flows from bed B1 through manifold 210, line 212, and manifold 117 into bed A3 (which earlier completed its evacuation step (2)) so that the pressure is beds B1 and A3 are equalized at a second intermediate pressure (step (1b)). Valves 7 and 61 are closed and then valve 40 is opened (valves 28, 32, 36, 44, 48, and 52 were closed in a previous step) so that gas now flows from bed B1 through manifold 210 into bed B4 (which earlier completed its purge step (4)) so that the pressure in beds B1 and B4 are equalized at a third intermediate pressure (step (1c)). Valve 37 is then closed; meanwhile, depressurization step (1) of Bed A1 continues. Bed B1 is then further depressurized to near ambient pressure by opening valve 33 so that gas flows from bed B1 through manifold 208 (step (3)). Valve 33 is closed to complete bed B1 depressurization step (3), and at approximately the same time valve 17 is closed to complete bed A1 depressurization step (1) at a pressure of between about 30 to 100 psia. Next, bed A1 is further depressurized or blown down to near atmospheric pressure by opening valves 5 and 62 whereby gas flows out of bed A1 and through manifold 117 as blowdown gas which optionally can be used as additional secondary key component product (step (1d)). At approximately the same time, bed B1 is purged (step (4)) by opening valves 29 and 41 so that high purity primary key component product flows through manifold 204, control valve 206, manifold 213, valve 41, line 222, bed B1, line 221, valve 29, and manifold 116. Optionally primary key component product can be provided for purge step (4) through line 310, control valve 207, line 311, and through manifold 213. Optionally, bed B1 purge effluent and depressurization gas flowing through manifolds 116 and 208 can be taken through line 209, compressor 301, and line 302 for further primary component recovery. While bed B1 purging continues, bed A1 depressurization or final blowdown step (1d) is completed by closing valves 5 and 62. Optionally, step (1d) may be omitted; in this option, depressurization step (1) would be continued until bed A1 reached about atmospheric pressure. Then, valves 9 and 13 are opened and bed A1 is evacuated by pulling gas from both ends of the bed through valves 9 and 13, manifold 106, and vacuum blower 107 (step (2)). High-purity secondary key component is produced through line 108. While evacuation of bed A1 continues, purge step (4) of bed B1 is completed and valves 29 and 41 are closed; next valves 37 and 38 are opened (valves 26, 30, 34, 42, 46, and 50 were closed in previous steps) and gas flows from bed B2 (which earlier completed its depressurization step (1b) through manifold 210 into bed B1 until the pressures in both beds are equalized at the third intermediate pressure (step (4a)). Valve 38 is then closed. In the meantime, evacuation step (2) of bed A1 continues; valve 39 is opened (valves 27, 31, 35, 43, 47, and 51 were closed in previous steps) and gas flows from bed B3 (which earlier completed its adsorption step) through manifold 210 into bed B1 until the pressures in both beds are equalized at the first intermediate pressure (step (4b)). Valve 37 is then closed. At the same time, evacuation of bed A1 is completed at a pressure between about 40 to 400 Torr by closing valves 9 and 13. Next, valves 5 and 61 are opened and gas flows from bed B3 (which earlier completed its depressurization step (4b)) through manifold 210, line 212, and manifold 117 into bed A1 until the pressure in both beds are equalized at the second intermediate pressure (step 2a)). At the same time, bed B1 is further pressurized by opening valve 45 whereby high-purity primary key component flows through manifold 204, control valve 205, manifold 214 and into bed B1 (step (4c)). Next, pressurization step (2a) of bed A1 is completed by closing valves 5 and 61. Valve 25 is then opened, and primary key component flows into and through bed B1 and into bed A1 until both beds are pressurized to a pressure up to the adsorption pressure (step (5)), and another cycle is ready to begin. The other sets of beds (A2 and B2, A3 and B3, A4 and B4) in turn undergo the same cycle through control, in a similar manner, of the appropriate valves associated with the beds. The relationship of these cycles to the cycle of beds A1 and B1 is given in Table 1.

In a second embodiment of the invention, referring now to Table 2 and FIG. 3, the adsorption step for beds A1 and B1 is carried out in exactly the same manner as described for the first embodiment.

TABLE 2

Process Cycle Steps (Embodiment #2)

| Time Period | Bed → A1 | A2 | A3 | A4 | B1 | B2 | B3 | B4 |
|---|---|---|---|---|---|---|---|---|
| 1 | A | EV | BD | DP | A | PR | PU | I |
| 2 | A | PE1 | EV | DP | A | PR | PU | PE1 |
| 3 | A | PE1 | EV | DP | A | PR | PU | PE1 |
| 4 | A | RP | EV | DP | A | RP | PE2 | PE2 |
| 5 | A | RP | EV | DP | A | RP | I | DP |
| 6 | A | RP | EV | DP | A | RP | I | DP |
| 7 | A | RP | EV | DP | A | RP | I | DP |
| 8 | A | RP | EV | BD | A | RP | I | PU |
| 9 | DP | A | EV | BD | I | A | PR | PU |
| 10 | DP | A | PE1 | EV | PE1 | A | PR | PU |
| 11 | DP | A | PE1 | EV | PE1 | A | PR | PU |
| 12 | DP | A | RP | EV | PE2 | A | RP | PE2 |
| 13 | DP | A | RP | EV | DP | A | RP | I |
| 14 | DP | A | RP | EV | DP | A | RP | I |
| 15 | DP | A | RP | EV | DP | A | RP | I |
| 16 | BD | A | RP | EV | PU | A | RP | I |
| 17 | BD | DP | A | EV | PU | I | A | PR |
| 18 | EV | DP | A | PE1 | PU | PE1 | A | PR |
| 19 | EV | DP | A | PE1 | PU | PE1 | A | PR |
| 20 | EV | DP | A | RP | PE2 | PE2 | A | RP |
| 21 | EV | DP | A | RP | I | DP | A | RP |
| 22 | EV | DP | A | RP | I | DP | A | RP |
| 23 | EV | DP | A | RP | I | DP | A | RP |
| 24 | EV | BD | A | RP | I | PU | A | RP |
| 25 | EV | BD | DP | A | PR | PU | I | A |
| 26 | PE1 | EV | DP | A | PR | PU | PE1 | A |
| 27 | PE1 | EV | DP | A | PR | PU | PE1 | A |
| 28 | RP | EV | DP | A | RP | PE2 | PE2 | A |
| 29 | RP | EV | DP | A | RP | I | DP | A |
| 30 | RP | EV | DP | A | RP | I | DP | A |
| 31 | RP | EV | DP | A | RP | I | DP | A |
| 32 | RP | EV | BD | A | RP | I | PU | A |

A = Adsorption
DP = Depressurization (Steps 1, 3)
EV = Evacuation (Step 2)
PE1 = First Pressure Equalization (Steps 1a, 2a)
PE2 = Second Pressure Equalization (Steps 1b, 4a)
PU = Purge (Step 4)
RP = Repressurization or Final Pressurization (Step 5)
I = Idle
BD = Blowdown or Further Depressurization (Step 1d)
PR = Initial Pressurization (Step 4b)

The other basic process steps for the second embodiment of (1) depressurization, (2) evacuation and (5) pressurization of the first or A1 bed, and (3) depressurization, (4) purge, and (5) pressurization of the second or B1 bed, and the blowdown or depressurization step (1d) of bed A1, also occur in the second embodiment as described above for the first embodiment. Optionally, step (1d) may be omitted as discussed earlier; in this option, depressurization step (1) would be continued until bed A1 reached about atmospheric pressure. The other pressurization and depressurization steps for the second embodiment are different than those of the first embodiment and are described in detail as follows.

(1a) Following the adsorption step, valves 37, 7, and 61 are opened (valves 3, 11, 15, 19, and 27 were closed in previous steps) and gas flows from bed B1 through manifold 210, line 212, and manifold 117 into bed A3 (which earlier completed its evacuation step (2)) until the pressures in both beds are equalized at a first intermediate pressure. Valves 7 and 61 are then closed.

(1b) Next, valve 40 is opened (valves 28, 32, 36, 44, 48, and 52 were closed in previous steps) and gas flows from bed B1 through manifold 210 into bed B4 (which earlier completed its purge step (4)) until the pressures in both beds are equalized at a second intermediate pressure. Valves 37 and 40 are then closed.

(4a) Following purge step (4) of bed B1, valves 37 and 38 are opened (valves 25, 26, 29, 30, 33, 34, 41, 42, 45, 46, 49, and 50 were closed in previous steps) and gas flows from bed B2 (which earlier completed its depressurization step (1a)) into bed B1 until the pressures in both beds are equalized at the second intermediate pressure. Valves 37 and 38 are then closed.

(4b) Following step (4a), valve 45 is opened and bed B1 is pressurized by high-purity primary key component product which flows through manifold 204, control valve 205, manifold 214, and into bed B1.

(2a) Following completion of evacuation step (2), valves 5, 61 and 39 are opened (valves 1, 9, 13, 17, 25, 27, 31, 35, 43, 47, and 51 were closed in previous steps) and gas flows from bed B3 (which earlier completed its adsorption step) through manifold 210, line 212, and manifold 117, into bed A1 until the pressures in both beds are equalized at the first intermediate pressure.

At the completion of above steps (2a) and (4b), valves 5 and 61 are closed and pressurization step (5) of beds A1 and B1 proceeds as described earlier for the first embodiment. The other sets of beds (A2 and B2, A3 and B3, A4 and B4) in turn undergo the same cycle through control in a similar manner of the appropriate valves associated with the beds. The relationship of these cycles to the cycle of beds A1 and B1 is given in Table 2. Optionally, primary key component product can be provided for purge step (4) through line 310, control valve 207, and line 311 into manifold 213. Optionally, at least a portion of bed B1 purge effluent and depressurization gas flowing through manifolds 116 and 208 can be taken through line 209, compressor 301, and line 302 for further primary component recovery.

Figure 4:
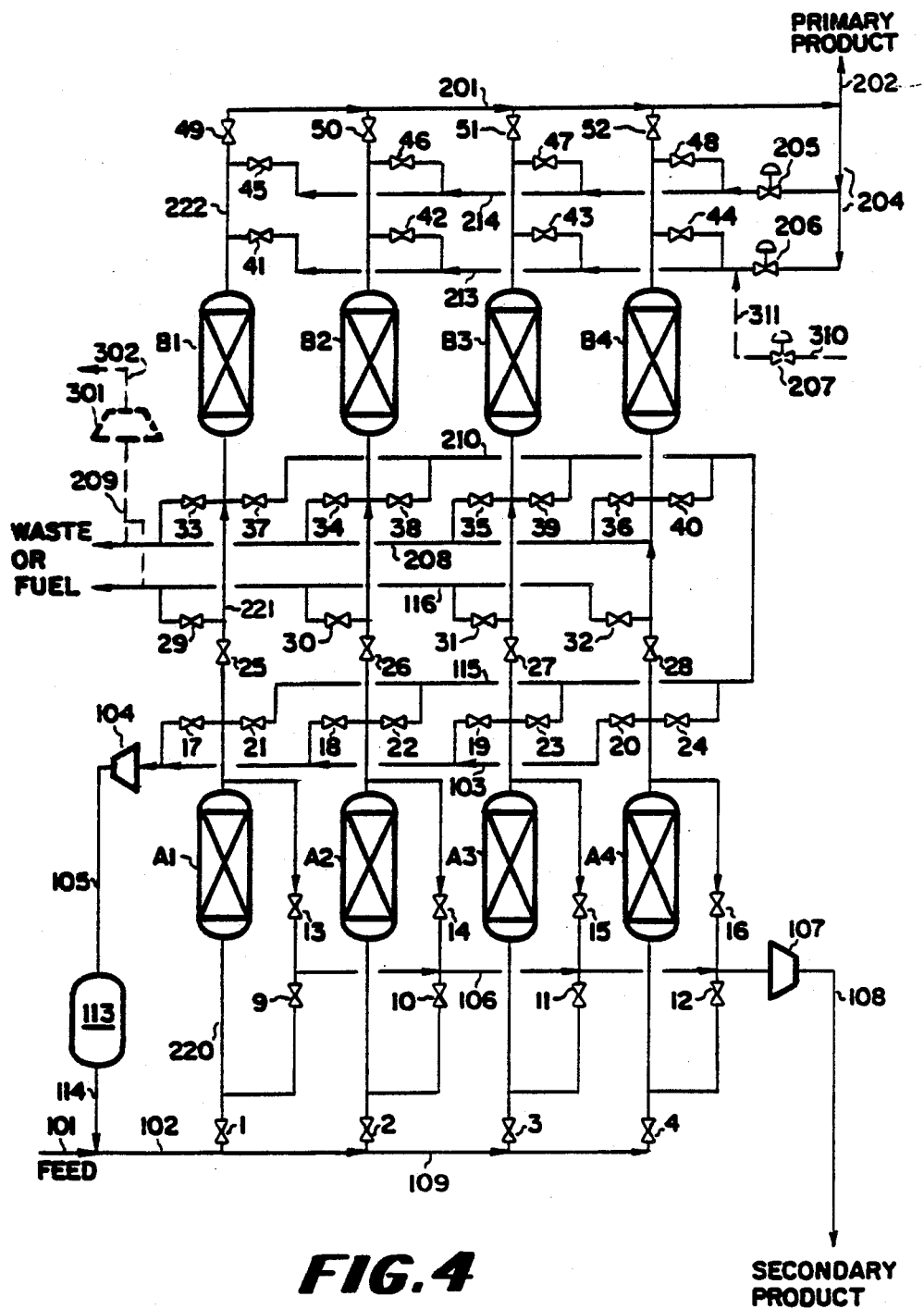
FIG. 4 is a process flow diagram for the third and fourth embodiments of the present invention.

In a third embodiment of the present invention, referring now to Table 3 and FIG. 4, the adsorption step for beds A1 and B1 begins with valves 1, 25, and 49 open, and valves 9, 13, 17, 21, 29, 33, 37, 41, 45, 50, 51, and 52 closed; both beds are at a pressure up to the adsorption pressure of between 30 and 500 psia, having been pressurized during the previous step. Multi-component gas mixture feed at the adsorption pressure and typically between 40° and 200° F. flows through line 101, is combined with recycle stream 114, and the combined stream flows through line 102 manifold 109, valve 1, line 220, bed A1, valve 25, line 221, bed B1, line 222, valve 49, manifold 201, and primary key component product is taken through line 202. When the concentration of secondary key component in bed A1 effluent (line 221), or the concentration of at least one tertiary component in bed B1 effluent (line 222) reaches a predetermined level, or after a predetermined time period, the adsorption step is completed and beds A1 and B1 are isolated by closing valves 1, 25, and 49. Next, bed A1 is depressurized (step (1)) by opening valve 17 whereby desorbed and void space gas flow from bed A1 and through manifold 103, is compressed by compressor 104, flows through line 105 into gas storage vessel 113, from where it is recycled through line 114 to join feed stream 101. While bed A1 is depressurizing, bed B1 is depressurized to a first intermediate pressure (step (1a)) by opening valves 23 and 37 (valves 3, 11, 15, 19, and 27 were closed in previous steps) so that depressurization gas flows 19, and 27 were closed in previous steps) so that depressurization gas flows from bed B1 through manifolds 210 and 115 into bed A3 (which earlier completed its evacuation step (2)).

TABLE 3

Process Cycle Steps
(Embodiment #3)

| Time Period | Bed → A1 | A2 | A3 | A4 | B1 | B2 | B3 | B4 |
|---|---|---|---|---|---|---|---|---|
| 1 | A | PE1 | EV | DP | A | PU | I | PE1 |
| 2 | A | I | EV | DP | A | PE2 | PU | PE2 |
| 3 | A | RP | EV | DP | A | RP | PU | DP |
| 4 | A | RP | EV | DP | A | RP | PU | I |
| 5 | DP | A | PE1 | EV | PE1 | A | PU | I |
| 6 | DP | A | I | EV | PE2 | A | PE2 | PU |
| 7 | DP | A | RP | EV | DP | A | RP | PU |
| 8 | DP | A | RP | EV | I | A | RP | PU |
| 9 | EV | DP | A | PE1 | I | PE1 | A | PU |
| 10 | EV | DP | A | I | PU | PE2 | A | PE2 |
| 11 | EV | DP | A | RP | PU | DP | A | RP |
| 12 | EV | DP | A | RP | PU | I | A | RP |
| 13 | PE1 | EV | DP | A | PU | I | PE1 | A |
| 14 | I | EV | DP | A | PE2 | PU | PE2 | A |
| 15 | RP | EV | DP | A | RP | PU | DP | A |
| 16 | RP | EV | DP | A | RP | PU | I | A |

A = Adsorption
DP = Depressurization (Steps 1, 3)
EV = Evacuation (Step 2)
PE1 = First Pressure Equalization (Steps 1a, 2a)
PE2 = Second Pressure Equalizaton (Steps 1b, 4a)
PU = Purge (Step 4)
RP = Repressurizaton or Final Pressurization (Step 5)
I = Idle While bed A1 depressurization continues, valve 23 is closed to complete bed B1 depressurization step (1a), and valve 39 is opened (valves 27, 31, 35, 43, 47, and 51 were closed in previous steps) so that gas now flows from bed B1 through manifold 210 into bed B3 (which earlier completed its purge step (4)) so that the pressure in beds B1 and B3 are equalized at a second intermediate pressure. Valves 39 and 37 are closed to complete step (1b). While depressurization step (1) of bed A1 continues, valve 33 is opened and bed B1 is depressurized to about 15 to 75 psia; depressurization gas flows through manifold 208 for use as fuel or for other purposes. Valve 33 is then closed. Meanwhile, depressurization step (1) of bed A1 continues until the bed pressure is about 15 psia. At this point, valve 17 is closed to complete the depressurization and bed A1 is evacuated by opening valves 9 and 13 whereby desorbed and void space gas is pulled through manifold 106, vacuum blower 107, and passes through line 108 as secondary key component product. While evacuation step (2) of Bed A1 continues, bed B1 is purged at 15 to 75 psia by opening valves 29 and 41 whereby high-purity primary key component flows through manifold 204, control valve 206, manifold 213, bed B1 and manifold 116. Purge effluent may be used for fuel or for other purposes. Optionally, primary key component product can be provided for purge step (4) through line 310, control valve 207, line 311, manifold 213. Optionally, at least a portion of bed B1 purge effluent and depressurization gas flowing through manifolds 116 and 208 can be taken through line 209, compressor 301, and line 302 for further primary component recovery. While this purge step (4) continues, evacuation step (2) of bed A1 is completed when the bed pressure reaches between 40 and 400 Torr, and valves 9 and 13 are closed. While purge step (4) continues, valves 21 and 39 are opened (valves 27, 31, 35, 43, 47, and 51 were closed in previous steps) and gas flows from bed B3 (which has just completed its adsorption step) into bed A1 until the pressures in both beds are equalized at the first intermediate pressure. Valve 21 is closed to complete this pressurization step (2a), and at the same time valves 29 and 41 are closed to complete purge step (4) of bed B1. Then, valve 37 is opened and gas flows from bed B3 (which has just completed its depressurization step (1a)) into bed B1 until the pressures in both beds are equalized at the second intermediate pressure. Valves 37 and 39 are then closed, completing step (4a). Finally, valves 45 and 25 are opened and high-purity primary key component flows through manifold 204, control valve 205, manifold 214, line 222, bed B1, line 221, and into bed A1 until both beds A1 and B1 are pressurized to a pressure up to the adsorption pressure. The other sets of beds (A2 and B2, A3 and B3, A4 and B4) in turn undergo the same cycle through control in a similar manner of the appropriate valves associated with the beds. The relationship of these cycles to the cycle of beds A1 and B1 is given in Table 3. The valve operation schedule for this third embodiment in FIG. 3 is given in Table 5.

In a fourth embodiment of the present invention, referring now to Table 4 and FIG. 4, the adsorption step and the other basic process steps of (1) depressurization and (2) evacuation of the first or A1 bed, (3) depressurization and (4) purge of the second or B1 bed, and (5) pressurization of both the A1 and B1 beds are carried out exactly as just described for the third embodiment. Optionally, primary key component product can be provided for purge step (4) through line 310, control valve 207, line 311, manifold 213. Optionally, at least a portion of bed B1 purge effluent and depressurization gas flowing through manifolds 116 and 208 can be taken through line 209 compressor 301, and line 302 for further primary component recovery.

TABLE 4

Process Cycle Steps
(Embodiment #4)

| Time Period | Bed → A1 | A2 | A3 | A4 | B1 | B2 | B3 | B4 |
|---|---|---|---|---|---|---|---|---|
| 1 | A | PE3 | EV | DP | A | PU | PE3 | I |
| 2 | A | I | EV | DP | A | PE1 | DP | PE1 |
| 3 | A | PE2 | EV | DP | A | I | PU | PE2 |
| 4 | A | RP | EV | DP | A | RP | PU | I |
| 5 | DP | A | PE3 | EV | I | A | PU | PE3 |
| 6 | DP | A | I | EV | PE1 | A | PE1 | DP |
| 7 | DP | A | PE2 | EV | PE2 | A | I | PU |
| 8 | DP | A | RP | EV | I | A | RP | PU |
| 9 | EV | DP | A | PE3 | PE3 | I | A | PU |
| 10 | EV | DP | A | I | DP | PE1 | A | PE1 |
| 11 | EV | DP | A | PE2 | PU | PE2 | A | I |
| 12 | EV | DP | A | RP | PU | I | A | RP |

TABLE 4-continued

Process Cycle Steps
(Embodiment #4)

| Time Period | Bed → | A1 | A2 | A3 | A4 | B1 | 82 | B3 | B4 |
|---|---|---|---|---|---|---|---|---|---|
| 13 | | PE3 | EV | DP | A | PU | PE3 | I | A |
| 14 | | I | EV | DP | A | PE1 | DP | PE1 | A |
| 15 | | PE2 | EV | DP | A | I | PU | PE2 | A |
| 16 | | RP | EV | DP | A | RP | PU | I | A |

A = Adsorption
DP = Depressurization (Steps 1, 3)
EV = Evacuation (Step 2)
PE1 = First Pressure Equalization (Steps 1a, 4a)
PE2 = Second Pressure Equalization (Steps 1b, 2b)
PE3 = Third Pressure Equalization (Steps 1c, 2a)
PU = Purge (Step 4)
RP = Repressurization or Final Pressurzation (Step 5)
I = Idle The other pressurization and depressurization steps for the fourth embodiment are different than those of the third embodiment and are described in detail as follows.

(1a) During depressurization step (1) of bed A1, valves 37 and 39 are opened (valves 25, 27, 29, 31, 33, 35, 41, 43, 45, 47, 49, and 51 were closed in previous steps) and gas flows from bed B1 through manifold 210 to bed B3 (which has just completed its purge step (4)) until the pressures in both beds are equalized at a first intermediate pressure. Valve 39 is then closed.

(1b) Next, valve 23 is opened (valves 3, 11, 15, 19, and 27 were closed in previous steps) and gas flows from bed B1 through manifolds 210 and 115 into bed A3 (which has earlier completed a pressurization step and is initially at a third intermediate pressure) until the pressures in both beds are equalized at a second intermediate pressure. Valve 23 is closed to complete the step. Depressurization step (1) of bed A1 continues until the bed pressure reaches about 15 psia, and valve 17 is closed to complete the depressurization step (1).

(1c) As evacuation step (2) of bed A1 begins, valve 24 is opened (valve 37 was open from previous step and valves 4, 12, 16, 20, and 28 were closed in previous steps) and gas flows from bed B1 through manifolds 210 and 115 and into bed A4 (which has just completed its evacuation step (2)) until the pressures in both beds are equalized at a third intermediate pressure. Valves 37 and 24 are then closed to complete the step.

(2a) While purge step (4) of bed B1 continues and after evacuation step of bed A1 is complete, valve 21 is opened (valve 38 was open and valves 26, 30, 34, 42, 46, and 50 were closed in previous steps) and gas flows from bed B2 (which earlier completed its depressurization step (1b)) into bed A1 until the pressures in both beds are equalized at the third intermediate pressure. Valves 21 and 38 are then closed to end the step at the same time as purge step (4) of bed B1 is completed.

(4a) Next, valves 37 and 39 are opened (valves 25, 27, 29, 31, 33, 35, 41, 43, 45, 47, 49, and 51 were closed in previous steps) and gas flows from bed B3 (which earlier completed its adsorption step) through manifold 210 into bed B1 until the pressures in both beds are equalized at the first intermediate pressure. Valve 37 is closed to complete the step. (2b) Next, valve 21 is opened (valve 39 is open from the earlier step (4a)) and gas flows from bed B3 (which has just completed its depressurization step (1a)) through manifolds 210 and 115 into bed A1 until the pressures in both beds are equalized at the second intermediate pressure. Valves 21 and 39 are then closed to complete the step. Pressurization step (5) of beds A1 and B1 then takes place to complete the cycle, and another cycle is ready to begin. The other sets of beds (A2 and B2, A3 and B3, A4 and B4) in turn undergo the same cycle through control in a similar manner of the appropriate valves associated with the beds. The relationship of these cycles to the cycle of beds A1 and B1 is given in Table 4.

In an optional embodiment, at least a portion of the gas from depressurization step (3) and purge step (4) of the second or B beds is processed for additional recovery of primary key component in a set of third (C) beds as illustrated in FIG. 2 and discussed earlier in brief. Referring to FIGS. 3 and 4, depressurization gas from beds B1 and through B4 flows through manifold 208 and purge effluent from beds B1 through B4 flows through manifold 116. At least a portion of the gas in manifolds 116 and 208 is taken through line 209, is compressed in compressor 301, and flows through line 302 into a gas storage vessel (not shown) which is part of the product recovery or C bed system 300 of FIG. 2. System 300 is a multiple-bed PSA system in which remaining impurities including secondary and tertiary components are selectively adsorbed and additional high-purity primary key component is recovered. At least a portion of this additional product returns to the second or B beds via line 310 of FIGS. 3 and 4, where it passes through control valve 207 and line 311 to join manifold 213 which supplies primary component purge gas to beds B1 through B4.

The process cycles for each of the four embodiments discussed above and summarized in Tables 1, 2, 3, and 4 are carried out over appropriate time periods depending on feed composition, pressure, product purity requirements, and other factors. Typically, the cycles in Tables 1, 2, 3, 4 would be 16 minutes in duration, so that each time period in Tables 1 and 2 would be 30 seconds and in Tables 3 and 4 would be one minute in duration. Other cycle time durations and lengths of individual time periods are possible depending upon the factors stated above.

The duration of the adsorption step depends upon several factors including required primary product purity, feed composition, adsorbent bed pressure and temperature, and bed size. Typically the duration is chosen to yield an impurity level in the primary product which is conservatively less than that of the primary product purity specification. Based on the above mentioned factors, and other design considerations, a typical adsorption step would be four minutes in duration, and the concentration of impurities in the very high purity hydrogen primary product at the end of the step typically would be less than 0.001 mole %.

In the four embodiments discussed above, final pressurization of the first (A) and second (B) beds (step (5)) is typically completed when the beds reach the pressure of the adsorption step. Optionally, the final pressurization step can be terminated at an intermediate pressure somewhat below the adsorption pressure, in which case the first (A) and second (B) beds would be pressurized from this intermediate pressure to the adsorption pressure by the multicomponent feed gas at the initiation of the adsorption step. In the pressurization and depressurization steps of pairs of connected beds as described above, each step is typically completed when the pressures in each bed become equal. Optionally, under certain process conditions, it may be desirable to complete one or more of these steps in a given embodiment before the pressures in selected pairs of connected beds become equal.

The adsorbent used in the first (A) beds should be capable of selectively adsorbing the secondary key component from the feed gas mixture at high selectivity and working capacity, and should possess relatively fast adsorption kinetics and low heat of adsorption for this component. The adsorbent used in the second (B) beds and the third (C) beds should be capable of selectively adsorbing the secondary key component as well as the tertiary components, and may include more than one type of adsorbent in multiple layers in each bed. A number of commerically available adsorbents fit these requirements for gas mixtures amenable to adsorptive separation by the process of the present invention. Thus, for the multicomponent gas mixture of the above example, NaX zeolite is preferred in the first (A) beds and a combination of NaX and CaA zeolites is preferred in the second (B) beds. Other zeolite adsorbents may be used depending on the process pressure and temperature, product purity and recovery requirements, feed gas composition, adsorbent cost relative to product value, and other factors involved in specific applications.

The cycles as described above and summarized in Tables 1 through 4 are carried out as previously discussed in the adsorption systems illustrated in the process flow diagrams of FIGS. 3 and 4. The control of the cycles by opening and closing the appropriate valves was described earlier for one of the first (A) beds in series with one of the second (B) beds for each of the four embodiments. The appropriate control of the cycle steps in the additional beds of each system is achieved by similar operation of additional valves in the systems. For illustration, the complete valve timing chart for the third embodiment utilizing the flowsheet of FIG. 4 is given in Table 5.

TABLE 5

Valve Sequence Chart
Embodiment #3
(FIG. 4)

| Time (min) | 1 | 2 | 3 | 4 | 9 | 10 | 11 | 12 | 13 | 14 | 15 | 16 | 21 | 22 | 23 | 24 | 17 | 18 | 19 | 20 | 33 | 34 | 35 |
|---|---|---|---|---|---|---|---|---|---|---|---|---|---|---|---|---|---|---|---|---|---|---|---|
| 0-1 | O | | | | | | O | | | | O | | O | | | | | | O | | | | |
| 1-2 | O | | | | | | O | | | | O | | | | | | | | O | | | | |
| 2-3 | O | | | | | | O | | | | O | | | | | | | | O | | | | |
| 3-4 | O | | | | | | O | | | | O | | | | | | | | O | | | | |
| 4-5 | | O | | | | | | | O | | | O | | | O | | O | | | | | | |
| 5-6 | | O | | | | | | | O | | | O | | | | | O | | | | | | |
| 6-7 | | O | | | | | | | O | | | O | | | | | O | | | O | | | |
| 7-8 | | O | | | | | | | O | | | O | | | | | O | | | | | | |
| 8-9 | | | O | O | | | | | | O | | | | O | | | | O | | | | | |
| 9-10 | | | O | O | | | | | | O | | | | | | | | O | | | | | |
| 10-11 | | | O | O | | | | | | O | | | | | | | | O | | | | O | |
| 11-12 | | | O | O | | | | | | O | | | | | | | | O | | | | | |
| 12-13 | | | | | O | O | | | O | | | | O | | | | | | O | | | | |
| 13-14 | | | | | O | O | | | O | | | | | | | | | | O | | | | |
| 14-15 | | | | | O | O | | | O | | | | | | | | | | O | | | | O |
| 15-16 | | | | | O | O | | | O | | | | | | | | | | O | | | | |

| Time (min) | 36 | 29 | 30 | 31 | 32 | 37 | 38 | 39 | 40 | 45 | 46 | 47 | 48 | 41 | 42 | 43 | 44 | 49 | 50 | 51 | 52 | 25 | 26 | 27 | 28 |
|---|---|---|---|---|---|---|---|---|---|---|---|---|---|---|---|---|---|---|---|---|---|---|---|---|---|
| 0-1 | | O | | | | | | | O | | | | | | O | | | O | | | | O | | | |
| 1-2 | | | O | | | | | O | O | | | | | | | O | | O | | | | O | | | |
| 2-3 | O | | O | | | | | | | | O | | | | | O | | O | | | | O | O | | |
| 3-4 | | | O | | | | | | | | O | | | | | O | | O | | | | O | O | | |
| 4-5 | | | O | | O | | | | | | | | | | | O | | | O | | | O | | | |
| 5-6 | | | | O | O | O | | | | | | | | | | | | | O | O | | O | | | |
| 6-7 | | | | O | | | | | | | | O | | | | | | | O | O | | O | O | | |
| 7-8 | | | | O | | | | | | | | O | | | | | | | O | O | | O | O | | |
| 8-9 | | | | O | | | O | | | | | | | | | | | | O | O | | | O | | |
| 9-10 | | O | | | | | | O | | | | | | O | | | | | O | | | | O | | |
| 10-11 | | O | | | | | | | | | | O | O | | | | | | O | | | | O | O | |
| 11-12 | | O | | | | | | | | | | O | O | | | | | | O | | | | O | O | |
| 12-13 | | O | | | | | | | O | | | | | | | | O | | | O | | | | O | O |
| 13-14 | | | | | O | | O | O | | | | | | O | | | O | | | O | | | | O | O |
| 14-15 | | | | | O | | | | | O | | | | O | | | O | | | | O O | O | | | O |
| 15-16 | | | | | O | | | | | O | | | | O | | | O | | | | O O | O | | | O |

O = open, otherwise closed

The present invention is an improvement upon the prior art adsorption process disclosed in U.S. Patent Re. 31,014 previously cited. In the present invention, the high-pressure rinse of the first or A beds as utilized in Re. 31,014 is eliminated and instead the depressurization gas is compressed to the adsorption pressure and directly recycled and combined with the fresh feed. In the prior art process, the gas from depressurization of each first or A beds is compressed and passed through another first bed and the effluent is recycled to feed. This rinse step can increase the purity of the secondary key component product and increase product recovery by recycling to feed.

It has been discovered in the present invention that when the selectivity of the secondary key component (2) to the primary key component (1), defined as $$S(2:1) = \left[ \frac{\text{Adsorbent Capacity (2)}}{\text{Gas Phase Mole Fraction (2)}} \right] \div \left[ \frac{\text{Adsorbent Capacity (1)}}{\text{Gas Phase Mole Fraction (1)}} \right]$$

is greater than about 20, the first bed of adsorbent after the depressurization step is nearly completely saturated with the secondary key component with typically very small amounts of co-adsorbed primary and tertiary components. The prior art rinse step thus may be unnecessary in some cases and product gas purity of the secondary key component in the evacuation gas product will be generally satisfactory. It was also discovered that the depressurization gas volume of the present invention is about 25% to 50% less than the total amount of depressurization gas compressed for the rinse step in the cited prior art process. This results in reduced compressor size and power requirement. As previously discussed, the present invention utilizes four first or A beds and four second or B beds, and each first bed operates with a given second bed as a pair throughout the cycle. This contrasts with the cited prior art process in which there are six first or A beds and three second or B beds. The equipment configuration and operating cycles of the present invention are thus simplified, and capital and operating costs can be reduced. In addition, the cycles of the present invention allow a continuous product flow of the primary key component without the use of a product surge tank as required in the prior art process.

A comparison between operating and equipment parameters for the first embodiment of the present invention and the above-referenced prior art process is given in Table 6. The prior art process performance is based upon pilot plant testing and commercial-scale plant operations using the prior art adsorption cycle. The predicted process performance of the present invention is based upon the use of the adsorption cycle of embodiment #1 in a commerical-scale plant design using laboratory pilot plant and other commercial-scale plant test data. The process performance of the embodiment of the present invention is equivalent to the prior art process in hydrogen purity and nearly equivalent in hydrogen recovery; however, the compressor size, compressor power, and vacuum blower power required are significantly lower for the present invention. In addition, the process equipment is simplified, requiring one less adsorbent vessel and 18 fewer valves than the prior art process. While carbon dioxide purity and recovery are somewhat lower for the present process than for the prior art process as shown in Table 6, this somewhat lower purity is satisfactory for most industrial uses of large volumes of $CO_2$ and the additional cost for a higher purity product is often not justified. The somewhat lower carbon dioxide recovery is more than offset by power and capital savings in the present invention.

TABLE 6

Performance Comparison of the Present Invention
Embodiment #1 With Prior Art U.S. Pat. No. Re. 31,014

|  | Present Invention | Prior Art |
|---|---|---|
| $H_2$ purity, mole % | 99.999 | 99.999 |
| $H_2$ recovery, % | 86 | 87 |
| $CO_2$ purity, mole % | 97.0+ | 99.0+ |
| CO recovery, % | 86 | 91 |
| Relative compressor size | 0.43 | 1.00 |
| Relative compressor power | 0.57 | 1.00 |
| Relative vacuum blower power | 0.86 | 1.00 |
| Number of adsorbent beds | 8 | 9 |
| Number of switch valves | 50 | 68 |

Additional product recovery is realized in the first, second, and fourth embodiments of the present invention by the use of additional pressure equalizations. Also, primary key component recovery can be increased to about 95% or higher by further treating the second bed depressurization and purge gas in a third adsorbent bed, which is one of a group of multiple parallel beds of adsorbent, wherein remaining impurities are selectively adsorbed as described earlier.

In the example discussed above, hydrogen was recovered as the primary key component and carbon dioxide as the secondary key component from gas mixture also containing carbon monoxide, methane, and nitrogen as tertiary components at low concentration. Other separations are possible using the process of the present invention; for example, hydrogen and carbon monoxide can be recovered as primary and secondary key component products from a gas mixture also containing impurity components which absorb less strongly than CO and more strongly than $H_2$, such as $N_2$ or $CH_4$. The present invention also can be utilized to recover hydrogen as the primary key component and $C_2$+ hydrocarbons as the secondary component from a mixture which also contains tertiary components such as methane or other components which adsorb more strongly than hydrogen but less strongly than $C_2$+ hydrocarbons.

In the four embodiments of the present invention, four first (A) beds and four second (B) beds were described. A greater number of beds may be used for specific cases and economic requirements. For example, five first (A) beds and five second (B) beds can be utilized in which the cycle steps of each pair of first (A) and second (B) beds overlap such that at any given time two pairs of A and B beds are always on the adsorption step. This reduces the size of product surge tanks and adsorbent vessels. The optimum number of beds will depend upon flow rates, process operating pressures, and the capital costs of pressure vessels, among other factors.

We claim:

1. In the separation of a multicomponent gas mixture by pressure swing adsorption to recover as individual products a primary key component and a secondary key component, wherein the secondary key component is more strongly adsorbed than the primary key component and there is present in the multicomponent gas mixture one or more minor tertiary components at low concentrations which are less strongly adsorbed than the secondary key component, by passing the multicomponent gas mixture in an adsorption step through a first bed of adsorbent selective for retention of the secondary key component, passing the effluent from said first bed through a second bed of adsorbent selective for the retention of the secondary key component and of the one or more minor tertiary components, withdrawing from said second bed a high purity product stream of the primary key component, and continuing said passing of the multicomponent gas mixture through the first and second beds until the concentration of the secondary key component in the effluent from the first bed or the concentration of at least one of the tertiary components in said high-purity stream of primary key component from the second bed reach predetermined levels, or until a predetermined time period has elapsed; the improvement comprising discontinuing flow of the multicomponent gas mixture through said first and second beds at the end of said adsorption step and thereafter during a mutually extending time period:

(1) depressurizing said first bed immediately after the discontinuing of flow through said first and second beds by withdrawing from said first bed a first gas stream comprising desorbed and void space gas until the concentration of the secondary key component reaches a predetermined level in said gas stream or until a predetermined pressure is reached;

(2) evacuating said first bed by withdrawing therefrom a product stream of substantially pure secondary key component;

(3) depressurizing said second bed by withdrawing therefrom a gas stream comprising desorbed and void space gas; and (4) purging said second bed by passing therethrough a stream of the primary key component whereby additional adsorbed components are desorbed and are withdrawn along with remaining void space gas in a purge effluent stream;

and thereafter following said mutually extending time period:

(5) further pressurizing said first and second beds to a pressure up to the pressure of the adsorption step by passing a portion of said high-purity product stream of primary key component into and through said second bed and passing pressurization effluent from said second bed into said first bed, whereby both beds are prepared for another cycle beginning with said adsorption step.

2. The process as recited in claim 1 wherein said first bed of adsorbent is one of a first group of multiple parallel beds and said second bed of adsorbent is one of a second group of multiple parallel beds, wherein each bed of said first group is paired with a corresponding bed of said second group, and wherein each pair of beds undergoes in turn said adsorption step, said steps (1) through (4) during said mutually extending time period, and said step (5).

3. The process as recited in claim 1 wherein at least a portion of said gas stream withdrawn during said step (1) of said first bed is recycled and combined with the multicomponent gas mixture, and the combined stream is passed as feed to said first bed of adsorbent.

4. The process as recited in claim 1 wherein following said step (1), said first bed is further depressurized by withdrawing therefrom a second gas stream rich in the secondary key component.

5. The process as recited in claim 1 wherein said primary key component is hydrogen, said secondary key component is carbon dioxide, and said minor tertiary components comprise one or more components selected from the group consisting of carbon monoxide, methane, and nitrogen.

6. The process as recited in claim 1 wherein additional primary key component is recovered by compressing and storing at least a portion of the depressurization gas stream withdrawn from said second bed during step (3) and at least a portion of the purge effluent stream withdrawn from said second bed during step (4), withdrawing the stored gas and passing it through a third bed of adsorbent in which components other than the primary key component are selectively adsorbed, withdrawing from said third bed additional high-purity primary key component product, and utilizing at least a portion of said product for purging said second bed of adsorbent.

7. The process as recited in claim 1 further comprising during said mutually extending time period the steps of:

(1a) following completion of the adsorption step, depressurizing said second bed to a first intermediate pressure by connecting it with an alternate second bed which has completed its pressurization step (4a) whereby gas flows from said second bed into said alternate second bed so that the pressures in both beds are equalized;

(1b) following depressurization step (1a), further depressurizing said second bed to a second intermediate pressure by connecting it with an alternate first bed which has completed its evacuation step (2) whereby additional gas flows from said second bed into said alternate first bed so that the pressures in both beds are equalized;

(1c) following depressurization step (1b), further depressurizing said second bed to a third intermediate pressure by connecting it with another alternate second bed which has completed its purge step (4) whereby additional gas flows from said second bed into said other alternate second bed so that the pressures in both beds are equalized;

(4a) following purge step (4) of said second bed, pressurizing said second bed to said third intermediate pressure by connecting it with yet another alternate second bed which has completed its depressurization step (1b) whereby gas flows from said yet another alternate second bed into said second bed so that the pressures in both beds are equalized;

(4b) following pressurization step (4a), further pressurizing said second bed to said first intermediate pressure by connecting it with said alternate second bed which has completed its adsorption step whereby gas flows from said alternate second bed into said second bed so that the pressures in both beds are equalized;

(2a) following evacuation step (2) of said first bed, pressurizing said first bed to said second intermediate pressure by connecting it with said alternate second bed which has completed its depressurization step (1a) whereby gas flows from said alternate second bed into said first bed so that the pressures in both beds are equalized; and (4c) following pressurization step (4b) of said second bed, further pressurizing said second bed by passing thereinto another portion of said high-purity product stream of primary key component.

8. The process as recited in claim 7 wherein following said step (1), said first bed is further depressurized by withdrawing therefrom a second gas stream rich in the secondary key component.

9. The process as recited in claim 8 wherein at least a portion of said second gas stream rich in the secondary key component provides substantially pure secondary key component product in addition to said product withdrawn during evacuation step (2).

10. The process as recited in claim 7 wherein said first bed is depressurized in step (1) in the same flow direction as that of the adsorption step.

11. The process as recited in claim 7 wherein said first bed of adsorbent is one of a first group of multiple parallel beds and said second bed of adsorbent is one of a second group of multiple parallel beds, wherein each bed of said first group is paired with a corresponding bed of said second group, and wherein each pair of beds undergoes in turn said adsorption step, said steps (1) through (4c) during said mutually extending time period, and said step (5).

12. The process as recited in claim 11 wherein said first group of beds and said second group of beds each contains four beds.

13. The process as recited in claim 11 wherein said first group of beds and said second group of beds each contains at least five beds.

14. The process as recited in claim 7 wherein at least a portion of said gas stream withdrawn during said step (1) of said first bed is recycled and combined with the multicomponent gas mixture, and the combined stream is passed as feed to said first bed of adsorbent.

15. The process as recited in claim 7 wherein additional primary key component is recovered by compressing and storing the depressurization gas stream withdrawn from said second bed during step (3) and the purge effluent stream withdrawn from said second bed during step (4), withdrawing the stored gas and passing it through a third bed of adsorbent in which components other than the primary key component are selectively adsorbed, withdrawing from said third bed additional high-purity primary key component product, and utilizing at least a portion of said product for purging said second bed of adsorbent.

16. The process as recited in claim 7 wherein said primary key component is hydrogen, said secondary key component is carbon dioxide, and said minor tertiary components comprise one or more components selected from the group consisting of carbon monoxide, methane, and nitrogen.

17. The process as recited in claim 1 further comprising during said mutually extending time period the steps of:
(1a) following completion of the adsorption step, depressurizing said second bed to a first intermediate pressure by connecting it with an alternate first bed which has completed its evacuation step (2) whereby gas flows from said second bed into said alternate first bed so that the pressures in both beds are equalized;
(1b) following depressurization step (1a), further depressurizing said second bed to a second intermediate pressure by connecting it with an alternate second bed which has completed its purge step (4) whereby additional gas flows from said second bed into said other second bed so that the pressures in both beds are equalized;
(4a) following completion of purge step (4) of said second bed, pressurizing said second bed to said second intermediate pressure by connecting it with another alternate second bed which has completed its depressurization step (1a) whereby gas flows from said other alternate second bed into said second bed so that the pressures in both beds are equalized;
(4b) following pressurization step (4a), further pressurizing said second bed by passing thereinto another portion of said high-purity product stream of primary key component; and
(2a) following evacuation of step (2) said first bed, pressurizing said first bed to said first intermediate pressure by connecting it with yet another alternate second bed which has completed its adsorption step whereby gas flows from said yet another alternate second bed into said first bed so that the pressures in both beds are equalized.

18. The process as recited in claim 17 wherein said first bed is depressurized in step (1) in the same flow direction as that of the adsorption step.

19. The process as recited in claim 17 wherein following said step (1), said first bed is further depressurized by withdrawing therefrom a second gas stream rich in the secondary key component.

20. The process as recited in claim 19 wherein at least a portion of said second gas stream rich in the secondary key component provides substantially pure secondary key component product in addition to said product withdrawn during evacuation step (2).

21. The process as recited in claim 17 wherein at least a portion of said gas stream withdrawn during said step (1) of said first bed is recycled and combined with the multicomponent gas mixture, and the combined stream is passed as feed to said first bed of adsorbent.

22. The process as recited in claim 17 wherein said first bed of adsorbent is one of a first group of multiple parallel beds and said second bed of adsorbent is one of a second group of multiple parallel beds, wherein each bed of said first group is paired with a corresponding bed of said second group, and wherein each pair of beds undergoes in turn said adsorption step, said steps (1) through (4b) during said mutually extending time period, and said step (5).

23. The process as recited in claim 1 further comprising during said mutually extending time period the steps of:
(1a) following the adsorption step, depressurizing said second bed to a first intermediate pressure by connecting it with an alternate first bed which has completed its evacuation step (2) whereby gas flows from said second bed into said alternate first bed so that the pressures in both beds are equalized;
(1b) following depressurization step (1a), further depressurizing said second bed to a second intermediate pressure by connecting it with an alternate second bed which has completed its purge step (4) whereby gas flows from said second bed into said alternate second bed so that the pressures in both beds are equalized;
(2a) following completion of evacuation step (2) of said first bed, pressurizing said first bed to said first intermediate pressure by connecting it with said alternate second bed which has completed its adsorption step whereby gas flows from said alternate second bed into said first bed so that the pressures in both beds are equalized; and
(4a) following purge step (4) of said second bed, pressurizing said second bed to said second intermediate pressure by connecting it with said alternate second bed which has completed its depressurization step (1a) whereby gas flows from said alternate second bed into said second bed so that the pressures in both beds are equalized.

24. The process as recited in claim 23 wherein said first bed of adsorbent is one of a first group of multiple parallel beds and said second bed of adsorbent is one of a second group of multiple parallel beds, wherein each bed of said first group is paired with a corresponding bed of said second group, and wherein each pair of beds undergoes in turn said adsorption step, said steps (1) through (4a) during said mutually extending time period, and said step (5).

25. The process as recited in claim 23 wherein following said step (1), said first bed is further depressurized by withdrawing therefrom a second gas stream rich in the secondary key component.

26. The process as recited in claim 1 further comprising during said mutually extending time period the steps of:

(1a) following the adsorption step, depressurizing said second bed to a first intermediate pressure by connecting it with an alternate second bed which has completed its purge step (4) whereby gas flows from said second bed into said alternate second bed so that the pressures in both beds are equalized;

(1b) following depressurization step (1a), further depressurizing said second bed to a second intermediate pressure by connecting it with an alternate first bed which is at a third intermediate pressure, whereby gas flows from said second bed into said alternate first bed so that the pressures in both beds are equalized;

(1c) following depressurization step (1b), further depressurizing said second bed to said third intermediate pressure by connecting it with another alternate first bed which has completed its evacuation step (2) whereby gas flows from said second bed into said other alternate first bed so that pressures in both beds are equalized;

(2a) following evacuation step (2) of said first bed, pressurizing said first bed to said third intermediate pressure by connecting it with another alternate second bed which has completed its depressurization step (1b) so that gas flows from said another alternate second bed into said first bed so that the pressures in both beds are equalized.

(4a) following completion of purge step (4) of said second bed, pressurizing said second bed to said first intermediate pressure by connecting it with said alternate second bed which has completed its adsorption step whereby gas flows from said alternate second bed into said second bed so that pressures in both beds are equalized; and (2b) following pressurization step (2a) of said first bed, further pressurizing said first bed to said second intermediate pressure by connecting it with said alternate second bed which has completed its depressurization step (1a) whereby gas flows from said alternate second bed into said first bed so that pressures in both beds are equalized.

27. The process as recited in claim 26 wherein said first bed of adsorbent is one of a first group of multiple parallel beds and said second bed of adsorbent is one of a second group of multiple parallel beds, wherein each bed of said first group is paired with a corresponding bed of said second group, and wherein each pair of beds undergoes in turn said adsorption step, said steps (1) through (4a) during said mutually extending time period, and said step (5).

28. The process as recited in claim 26 wherein following said step (1), said first bed is further depressurized by withdrawing therefrom a second gas stream rich in the secondary key component.

29. The process as recited in claim 1 further comprising during said mutually extending time period the steps of:

(1a) following completion of the adsorption step, depressurizing said second bed by connecting it with an alternate second bed which has completed its pressurization step (4a) whereby gas flows from said second bed into said alternate second bed;

(1b) following depressurization step (1a), further depressurizing said second bed by connecting it with an alternate first bed which has completed its evacuation step (2) whereby additional gas flows from said second bed into said alternate first bed;

(1c) following depressurization step (1b), further depressurizing said second bed by connecting it with another alternate second bed which has completed its purge step (4) whereby additional gas flows from said second bed into said another alternate second bed;

(4a) following purge step (4) of said second bed, pressurizing said second bed by connecting it with yet another alternate second bed which has completed its depressurization step (1b) whereby gas flows from said yet another alternate second bed into said second bed;

(4b) following pressurization step (4a), further pressurizing said second bed by connecting it with said alternate second bed which has completed its adsorption step whereby gas flows from said alternate second bed into said second bed;

(2a) following evacuation step (2) of said first bed, pressurizing said first bed by connecting it with said alternate second bed which has completed its depressurization step (1a) whereby gas flows from said alternate second bed into said first bed; and (4c) following pressurization step (4b) of said second bed, further pressurizing said second bed by passing thereinto another portion of said high-purity product stream of primary key component.

* * * * *